United States Patent Office 3,606,492
Patented Sept. 20, 1971

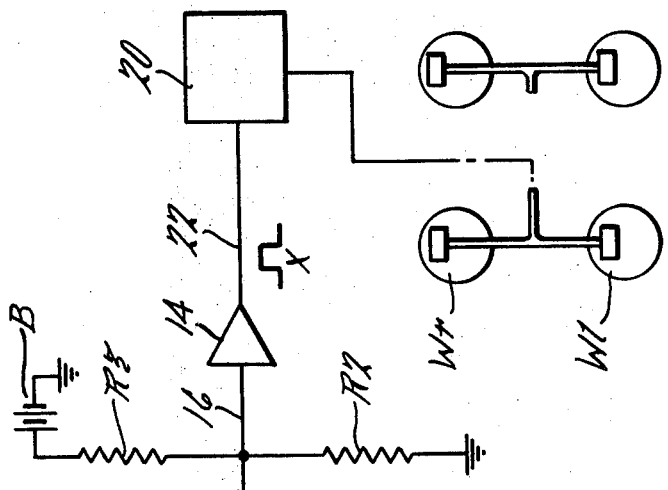
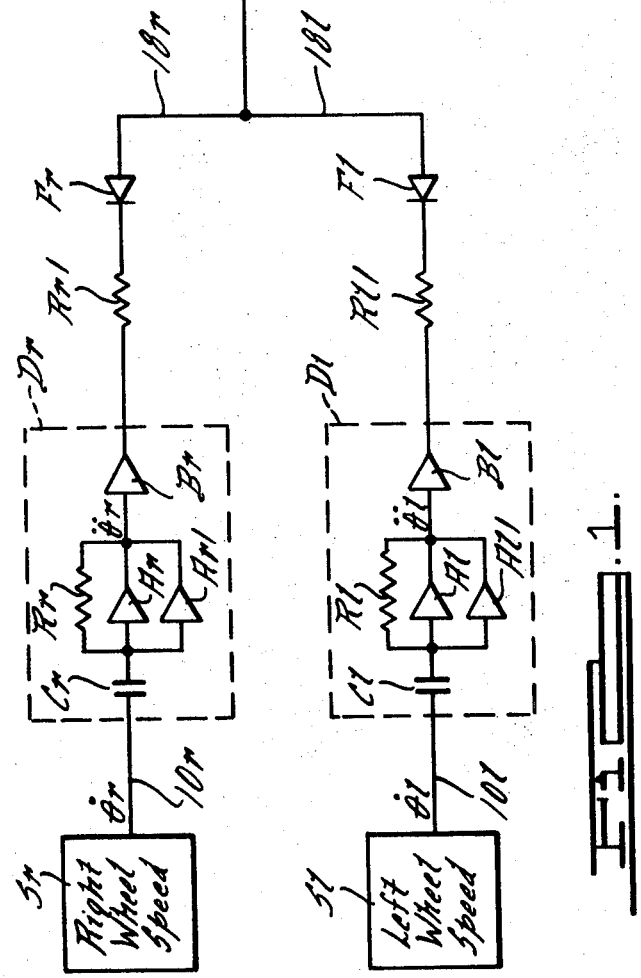
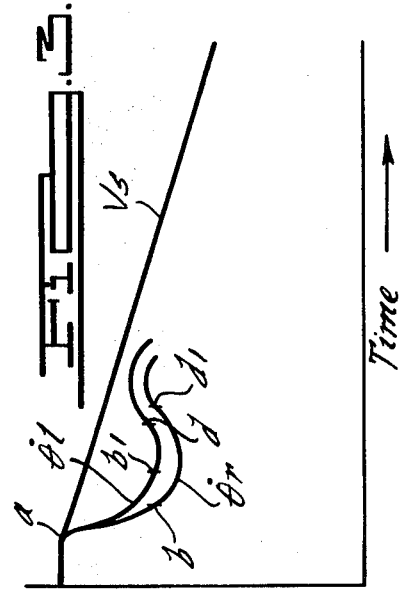
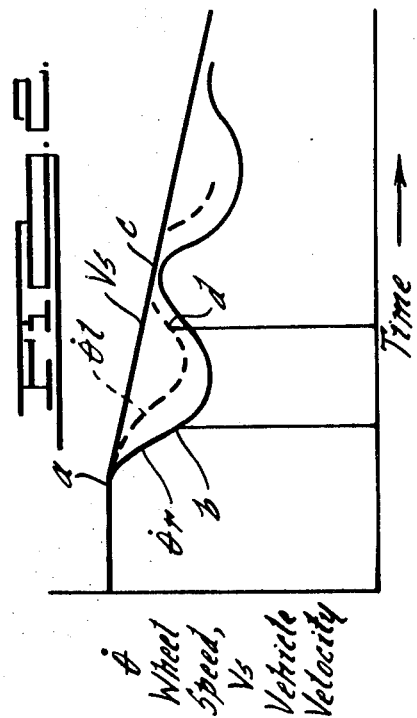

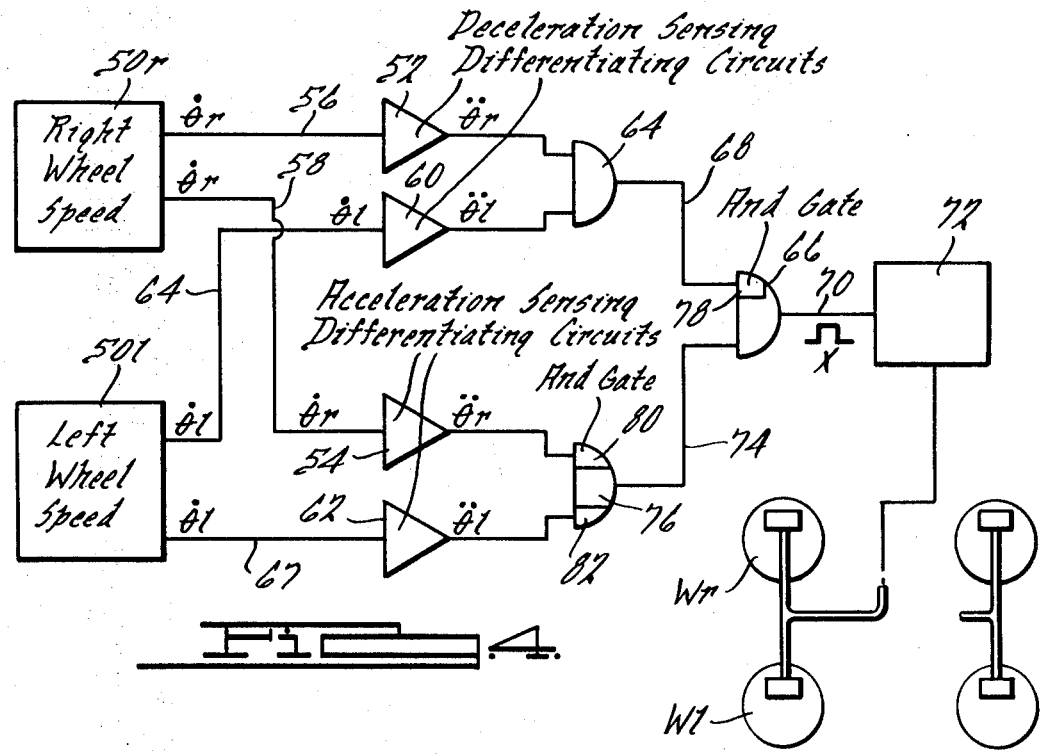
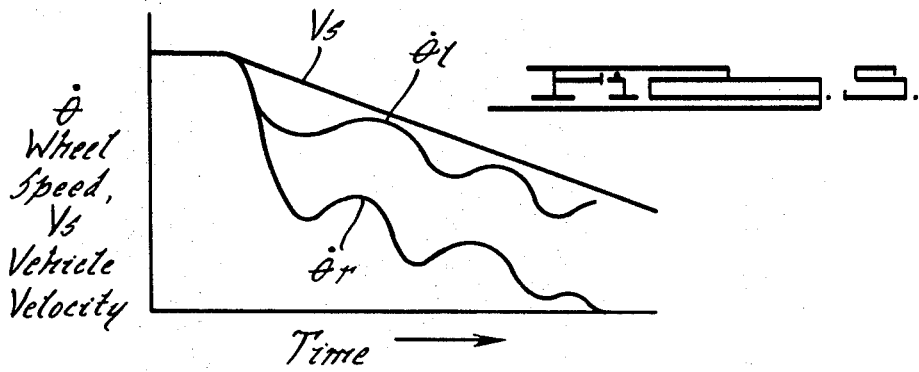
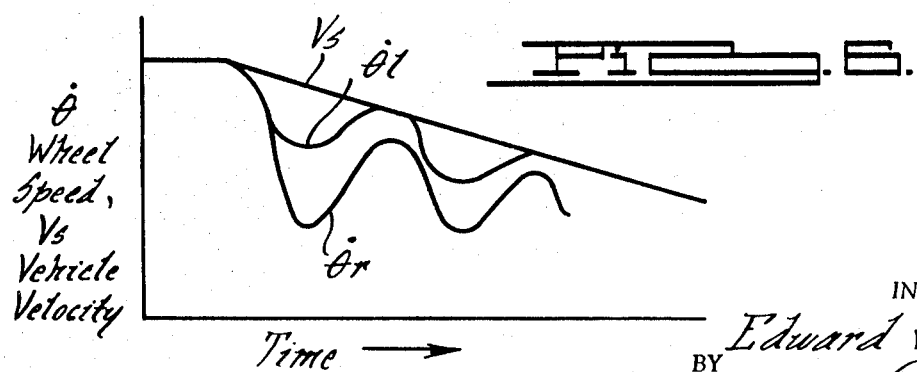

3,606,492
SKID CONTROL SYSTEM
Edward J. Hayes, Ann Arbor, Mich., assignor to
Kelsey-Hayes Company, Romulus, Mich.
Filed Mar. 7, 1969, Ser. No. 805,318
Int. Cl. B60t 8/08
U.S. Cl. 303—21EB                                    13 Claims

ABSTRACT OF THE DISCLOSURE

A skid control system for a wheeled vehicle having a plurality of wheels and a brake system for the wheels with at least two of the wheels being connected to a common brake pressure modulating device which is actuated to relieve brake pressure in response to both of the two wheels being in a skid condition and in one form, actuated to reapply brake pressure in response to either of the two wheels spinning up or, in another form, actuated to reapply brake pressure in response to both of the two wheels spinning up.

BACKGROUND OF THE INVENTION

The present invention relates to skid control systems and more particularly to skid control systems including at least a pair of wheels having brakes, the brake pressure of which is modulated by a common device.

In skid control systems utilizing a common device for modulating the brakes of a pair of wheels it is desirable that the device be actuated such as to maximize braking effectiveness while still preventing skidding (wheel lock-up). One problem with the use of a common actuator is that both wheels in many instances are not behaving in the same manner. This problem is, for some circumstances, solved by the system of the present invention. In this system the condition of each of the pair of wheels is sensed and braking is continuously cycled with pressure relieved only when both wheels are in incipient skid conditions. This provides an advantage for a situation in which the brakes of the paired wheels are unbalanced. With unbalanced brakes, i.e., one providing greater braking force than the other for the same pressure, there would be a tendency for the wheel with greater braking effect to go into a skid condition first. If the brake pressure were relieved at both wheels in response to the skid condition occurring at only the one wheel the lesser braked wheel would, because of pressure relief, provide little braking effect on the vehicle. Thus as the brake pressure was cycled there would be a tendency for the lesser braked wheel to free roll whereby only the brakes of the one wheel (the one in the skid condition) would be fully effective for retarding the vehicle. In the present invention, since both wheels must be in the incipient skid condition before pressure relief occurs, neither will be free rolling and both will be cycled such as to be effective to assist braking. Therefore it is an object of the present invention to provide a skid control system of the above described type in which brake pressure relief is initiated in response only to skid conditions occurring at both wheels. Note that for balanced brakes between both wheels the system of the present invention will also be effective to provide good braking since both wheels will be cycled in a manner providing effective braking for each.

While it is desirable to initiate brake relief as noted above, it is, for some conditions, desirable to reapply brake pressure when either wheel recovers (spins-up short of free rolling) and, for other conditions, it is desirable to reapply brake pressure only when both wheels recover (spin-up short of free rolling). In general braking effectiveness (stopping distance) is improved if neither wheel is permitted to free roll during skid control cycles. Thus, in the first form, by reapplying the brakes in response to the first to spin-up (short of free roll) it is assured that neither wheel will free roll and good braking effectiveness will result. Therefore, it is another object of the present invention to provide a skid control system of the above described type in which the brakes are reapplied when the first wheel spins up.

In the alternate form noted, the brakes are reapplied only after both wheels spin-up. In some circumstances, this latter type of operation is advantageous. For example, if there were a substantial unbalance between the brakes of the two wheels, then if the brakes were reapplied in response to the first wheel to spin-up the second wheel (in view of the substantial disparity) could be near lock-up and in subsequent cycles could eventually become locked up resulting in a reduction in directional stability. This problem is avoided in the latter form of the invention by providing for brake reapplication in response to both wheels spinning up. Therefore, it is another object of the present invention to provide a system of the above described type in which the brakes are reapplied in response to both wheels spinning up.

It is another general object to provide a novel skid control system.

Other objects, features, and advantages of the present invention will become apparent from the subsequent description and the appended claims, taken in conjunction with the accompanying drawings, in which:

FIG. 1 is a partial schematic and partial block diagram of one form of the present invention;

FIGS. 2 and 3 are graphs of wheel speed versus time exemplifying operation of the system of FIG. 1;

FIG. 4 is a partial schematic and partial block diagram of a modified form of the present invention; and FIGS. 5 and 6 are graphs of wheel speed versus time exemplifying operation of the system of FIG. 4.

Looking now to FIG. 1 a system is shown having a control cycle in which brake pressure is relieved only when both wheels are in a detected skid condition and is reapplied when either wheel spins-up. In the system shown a preselected deceleration rate of the wheel is selected as an indication of incipient skid and a preselected acceleration rate of the wheel (spin-up) is selected as an indication of wheel recovery. In FIG. 1 wheel speed sensors $Sr$ and $Sl$ provide output signals $\theta r$ and $\theta l$, the magnitude of which are indicative of speed of the associated wheel. The velocity signals are transmitted to differentiating circuits $Dr$ and $Dl$, respectively, via conductors $10r$ and $10l$, respectively. Differentiating circuit $Dr$ comprises a coupling capacitor $Cr$ and an amplifier $Ar$ which is shunted by a resistor $Rr$; the result is a differentiated signal $\dot{\theta}r$ at circuit $Dr$. Circuit $Dl$ is similar and like components have been given similar letter designations with the addition of postscripts "$l$" and it provides a differentiated signal $\dot{\theta}l$. The differentiating circuits $Dr$ and $Dl$ have amplifiers $Br$ and $Bl$ which are normally "on" or conductive and will be rendered non-conductive in response to the associated signals $\dot{\theta}r$ and $\dot{\theta}l$ attaining a preselected magnitude indicative of incipient skid of the related wheel.

A control amplifier 14 has its input 16 connected to B+ via resistor R3 and to ground via resistor R2. Resistors R3 and R2 provide the bias for amplifier 14 and will normally maintain it biased "off" or non-conductive as long as either amplifier Br or Bl are "on." Thus with amplifier Br "on" resistor R2 will be shunted by diode Fr (connected to conductor 16 via conductor 18r) and a resistor Rr1 connected between diode Fr and differentiating circuit Dr such that the voltage across R2 will be reduced maintaining amplifier 14 "off." In a similar manner amplifier Bl when "on" will maintain amplifier 14 "off" by means of diode Fl and resistor Rl1. Amplifier 14 controls a modulating device 20 which in turn controls the brakes to right and left wheels Wr and Wl, respectively. The modulating device 20 can be a valve of the type shown and described in the copending U.S. patent application to Every et al., Ser. No. 642,861, filed June 1, 1967, now abandoned, and the disclosure of that application is incorporated herein by reference.

The device 20 in response to an output signal X from amplifier 14 via conductor 22 will be actuated to relieve pressure to the brakes for wheels Wr and Wl and upon cessation of signal X from 14 will be actuated (or deactuated) to reapply pressure to the brakes.

In operation, for normal brake stops neither wheel Wr or Wl will be decelerating excessively and the amplifier 14 will not be actuated to generate signal X.

Assume now that the brakes have been applied excessively and that because of brake unbalance the right wheel Wr decelerates more rapidly than left wheel Wl. First the right wheel speed signal $\theta$ from sensor Sr will have a rate of change, corresponding to deceleration of wheel Wr, which will be detected by differentiating circuit Dr; when this rate attains a preselected magnitude indicative of an incipient skid condition at wheel Wr amplifier Br will be rendered non-conductive. Since at this time amplifier Bl is still conductive amplifier 14 cannot be turned on since diode Fl still conducts and provides a parallel, low impedance circuit across bias resistor R2. Thus brake pressure will not be relieved by modulating device 20 if only one of the wheels Wr and Wl approaches a skid condition. When the other wheel Wl also decelerates excessively the derivative of its velocity signal $\theta l$ by differentiation circuit Dl will attain the preselected magnitude rendering amplifier Bl non-conductive. Now with both amplifiers Br and Bl non-conductive both diodes Fr and Fl will be biased off and the potential at resistor R2 can rise to a level turning amplifier 14 on producing signal X for actuating modulating device 20 whereby pressure to the brakes for wheels Wr and Wl will be relieved.

Amplifier Br once rendered non-conductive will remain non-conductive until either a preselected interval has elapsed after the deceleration signal $\theta r$ has diminished from the magnitude which rendered Br non-conductive or until an actuating signal has been received indicating that the wheel Wr has spun-up. Amplifier Bl operates in a similar manner. Thus the brakes will remain relieved until one of the amplifiers Br or Bl has timed out or one of the wheels spins up to a preselected magnitude of acceleration. A similar type of operation is described and shown in the copending U.S. patent application of Atkins, Ser. No. 761,709, filed Sept. 23, 1968 and that disclosure is incorporated herein by reference.

The differentiating circuit Dr includes a second amplifier Ar1 which is responsive to acceleration of the wheel Wr or to the rate of change of increase in magnitude of velocity signal $\theta r$. Thus when $\theta r$ reaches a magnitude indicative of a preselected magnitude of wheel spinup amplifier Ar1 will be actuated to turn amplifier Br on. With amplifier Br on the potential access resistor R2 will drop turning amplifier 14 off deactuating modulating device 20 whereby pressure will be reapplied to both of the wheels Wr and Wl. In a similar manner the differentiating circuit Dl is responsive to a spin-up signal provided by amplifier Al1. Thus the system of FIG. 1 is operative to provide a skid control cycle in which brake pressure is relieved at both wheels Wr and Wl only when both wheels are in an incipient skid condition and brake pressure will be reapplied when either wheel Wr or Wl spins-up to a selected acceleration rate.

As noted the above system is advantageous for a condition in which there is unbalance between the brakes for wheels Wr and Wl; this is in contrast to a system in which pressure relief occurs in response to either wheel being in incipient skid. In FIG. 2 a curve for wheel speed ($\theta$) versus time is shown depicting the deceleration of wheels during a brake stop for a system in which pressure relief occurs when either of the wheels is in incipient skid. The vehicle velocity Vs is shown to decrease from the point $a$ at which brakes are initially applied. For FIG. 2, it is assumed that the right wheel (Wr) brakes are, because of unbalance, more heavily actuated than the left wheel (Wl) brakes. Thus the right wheel (Wr) decreases in speed more rapidly than the left wheel (Wl). The right wheel (Wr) will attain the selected deceleration rate first at point $b$ whereby pressure relief is initiated at both wheels (Wr and Wl) and both will spin-up. Note that the wheel Wl has decreased substantially less in speed and will more readily spin-up to vehicle speed (Vs) at $c$ despite reapplication of brake pressure at $d$. Thus the wheel Wl will be operating at substantially less slip (Vs–$\theta$) than wheel Wr and substantially less than that magnitude of slip at which maximum retarding force occurs. Hence with wheel Wl at or near free rolling for a time during each cycle, inefficient braking will result. FIG. 3 is a curve similar to FIG. 2 except it is for the system of FIG. 1. Thus in FIG. 2, the pressure relief signal X occurs at point $b1$ at which time both wheels Wr and Wl are in incipient skid. With brake pressure reapplied at $d$ neither will spin-up to vehicle speed Vs; the result will be braking of both wheels at a more desirable slip over the skid control cycle resulting in more effective braking.

In the embodiment of FIG. 1, as noted, brake reapplication is initiated when either wheel spins-up to a preselected acceleration ($\theta$); this is shown in both FIGS. 2 and 3 as occurring at point $d$. This is advantageous where the degree of brake unbalance is not inordinate and (as can be seen in FIG. 3) will assist in preventing either wheel from attaining vehicle speed (Vs); it is apparent from FIG. 3 that if the system required both wheels to spin-up before brakes were reapplied, i.e. wheel Wr attaining an acceleration at $d1$, corresponding to point $d$ for wheel Wl, that wheel Wl would in all probability be free-rolling for a portion of the cycle as a result of brake reapplication occurring later in the spin-up portion of the cycle.

Therefore in the embodiment of FIG. 1 by providing brake release to occur in response to both wheels attaining a skid condition and by providing brake reapplication to occur in response to the first wheel attaining a preselected spin-up efficient braking will be provided especially where a moderate degree of brake unbalance exists.

Where the degree of brake unbalance is severe it is advantageous to reapply brakes after both wheels have spun-up. While this will result in one wheel (the lightly braked one) being at a near free rolling it will act to prevent the other wheel (the heavily braked one) from locking up. The result is better directional stability. This is exemplified by the curves of FIGS. 5 and 6. FIG. 5 shows a system for wheels having a severe brake unbalance and in which brakes are reapplied in response to the first wheel to spin-up. It can be seen that the lightly braked wheel Wr will eventually cycle to lock-up leading to directional instability. FIG. 6, however, depicts operation of the system of FIG. 4 in which the brakes are reapplied only after both wheels have spun-up; note, that wheel lock-up is prevented.

Looking now to FIG. 4 right and left wheel sensors 50r and 51l, respectively, provide output signals θr and θl, respectively, which are indicative of the associated wheel speed. Signal θr is transmitted to differentiating circuits 52 and 54 via conductors 56 and 58, respectively, while signal θl is transmitted to differentiating circuits 60 and 62 via conductors 64 and 66, respectively. Differentiating circuits 52 and 60 sense deceleration and provide output signals θ̇r and θ̇l when the derivatives of θr and θl exceed a preselected magnitude indicative of an incipient skid condition. The signals θ̇r and θ̇l are transmitted to an "and gate" 64 which is normally non-conductive and which will conduct only when both θ̇r and θ̇l are present, i.e. indicating incipient skid at both wheels Wr and Wl. The output from the gate 64 is transmitted to "and gate" 66 via conductor 68. And gate 66 is normally non-conductive and when energized will provide an output signal X at conductor 70 which is connected to the modulating device 72 (similar to modulating device 20 of FIG. 1) whereby the pressure to the brakes for wheel Wr and Wl can be relieved. And gate 66, however, requires that it receive signals at both conductor 68 and a second input conductor 74 in order to conduct. Conductor 74 is connected to an "and gate" 76 which is normally "on" or conductive. Thus upon the occurrence of a skid condition at both wheels Wr and Wl signals θ̇r and θ̇l will both be generated, energizing and gate 64 and rendering and gate 66 conductive. Signal X will be generated and modulating device 72 will be actuated to relieve brake pressure. And gate 66 is provided with a time hold circuit 78 such that after termination of either signals θ̇r or θ̇l, the signal from conductor 68 will be stored tending to maintain and gate 66 "on." As the wheels Wr and Wl spin-up because of relief of brake pressure the acceleration rate will be detected by differentiating circuits 54 and 62. Thus circuits 54 and 62 will provide output signals θ̈r and θ̈l only after both wheels have spun-up to a preselected acceleration rate. Signals θ̈r and θ̈l are transmitted to time hold circuits 80 and 82 of and gate 76 such that the occurrence of either signal θ̈r or θ̈l will be retained for a preselected interval; this is provided since it is not expected that θ̈r and θ̈l will occur simultaneously (see FIG. 6). "And gate" 76 is normally conductive and will be turned "off" only when signals θ̈r and θ̈l both have occurred indicating that both wheels Wr and Wl have spun-up. When this occurs "and gate" 76 will be rendered non-conductive turning "and gate" 66 off. This in turn will result in cessation of signal X and the reapplication of brake pressure by modulating device 72. Note that the memory 66 is provided to permit ample time for acceleration signal θ̈r and θ̈l to be generated from circuits 54 and 62 after cessation of deceleration signals θ̇r and θ̇l from circuits 52 and 60. The circuit of FIG. 4 will perform in the manner depicted in the curves of FIG. 6 and hence will be operative to inhibit wheel lock up and will enhance directional stability.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. A skid control system for a wheeled vehicle having a plurality of wheels being braked by a brake system, said skid control system comprising: modulating means connected to the brake for at least two of the wheels for relieving brake actuation only in response to a first control signal, signal means connected to each said at least two wheels for providing said first control signal only when said each of said at least two wheels is in a skid condition, whereby said skid control system is adapted so that said modulating means does not relieve brake actuation when fewer than said at least two wheels are in a skid condition.

2. The system of claim 1 with said modulating means reapplying brake actuation in response to a second control signal, said signal means providing said second control signal when the first one of said each of said at least two wheels has generally recovered from the skid condition.

3. The system of claim 1 with said modulating means reapplying brake actuation in response to a second control signal, said signal means providing said second control signal only after all of said at least two wheels has generally recovered from the skid condition.

4. A skid control system for a wheeled vehicle having a plurality of wheels being braked by a brake system, said skid control system comprising: modulating means connected to the brake for at least two of the wheels for relieving brake actuation in response to a first control signal, and signal means connected to each said at least two wheels for providing said first control signal only when said each of said at least two wheels is in a skid condition, said signal means including wheel speed means for sensing and for providing a wheel velocity signal indicative of the speed of said each of said at least two wheels, first means responsive to each said wheel velocity signal for providing a first signal indicative of a skid condition at the associated wheel, and and-circuit means responsive to each said first signal for providing said first control signal when said first signal is received for each of said at least two wheels.

5. The system of claim 4 with said modulating means reapplying brake actuation in response to a second control signal, said signal means providing said second control signal when the first one of said each of said at least two wheels has generally recovered from the skid condition.

6. The system of claim 5 with said signal means comprising second means responsive to each said wheel velocity signal for providing a second signal indicative of recovery from the skid condition at the associated wheel, said and-circuit means responsive to each said second signal for providing said second signal in response to reception of the first said second signal from any one of said at least two wheels.

7. The system of claim 6 with said first and second means comprising differentiating circuits for differentiating said wheel volocity signal and with said first and second signals being provided in response to a preselected magnitude of the derivative of said wheel velocity signal.

8. The system of claim 4 with said modulating means reapplying brake actuation in response to a second control signal, said signal means providing said second control signal only after all of said at least two wheels has generally recovered from the skid condition.

9. The system of claim 8 with said signal means function comprising second means responsive to each said wheel velocity signal for providing a second signal indicative of recovery from the skid condition at the associated wheel, said and-circuit means responsive to each said second signal for providing said second control signal when said second signal is received for each of said at least two wheels.

10. The system of claim 9 with said first and second means comprising differentiating circuits of differentiating said wheel velocity signal and with said first and second signals being provided in response to preselected magnitudes of the derivative of said wheel velocity signal.

11. A skid control system for a wheeled vehicle having a plurality of wheels being braked by a brake system, said skid control system comprising: modulating means connected to the brake for at least two of the wheels for relieving brake actuation in response to a first control signal, and signal means connected to each said at least two wheels for providing said first control signal only when said each of said at least two wheels is in a skid condition, said signal means including means for preventing said first control signal when only one of said at least two wheels is in a skid condition.

12. The system of claim 11 with said modulating means reapplying brake actuation in response to a second control signal, said signal means providing said second control signal when the first one of said each of said at least two wheels has generally recovered from the skid condition.

13. The system of claim 11 with said modulating means reapplying brake actuation in response to a second control signal, said signal means providing said second control signal only after all of said at least two wheels has generally recovered from the skid condition.

References Cited

UNITED STATES PATENTS

| | | | |
|---|---|---|---|
| 2,869,687 | 1/1959 | Keim et al. | 303—21X |
| 3,264,040 | 8/1966 | Brueder | 303—21 |

MILTON BUCHLER, Primary Examiner

J. J. McLAUGHLIN, Assistant Examiner

U.S. Cl. X.R.

188—181A; 303—20

UNITED STATES PATENT OFFICE
CERTIFICATE OF CORRECTION

Patent No. 3,606,492    Dated September 20, 1971

Inventor(s) Edward J. Hayes

It is certified that error appears in the above-identified patent and that said Letters Patent are hereby corrected as shown below:

Column 3, line 31, delete "$\Theta$" and substitute therefor --$\dot{O}$r--
Column 5, line 1, delete "511" and substitute therefor --501--

Signed and sealed this 4th day of April 1972.

(SEAL)
Attest:

EDWARD M. FLETCHER, JR.
Attesting Officer

ROBERT GOTTSCHALK
Commissioner of Patents